United States Patent [19]

Bertinsson et al.

[11] Patent Number: 5,261,283
[45] Date of Patent: Nov. 16, 1993

[54] MEASURING DEVICE AND METHOD FOR CLEANSING A MEASURING ELECTRODE IN SAID DEVICE

[75] Inventors: Gert-Inge Bertinsson, Lund; Leif Mattisson, Södra Sandby; Göran Ohlsson, Helsingborg, all of Sweden

[73] Assignee: Gambro AB, Sweden

[21] Appl. No.: 816,750

[22] Filed: Jan. 2, 1992

[30] Foreign Application Priority Data

Feb. 4, 1991 [SE] Sweden ................. 9100328

[51] Int. Cl.[5] .................................. G01F 1/58
[52] U.S. Cl. ........................ 73/861.12; 73/198; 204/402
[58] Field of Search .............. 73/861.12, 198; 134/1, 134/184; 204/402

[56] References Cited

U.S. PATENT DOCUMENTS

| 2,768,135 | 10/1956 | Adelson | 204/402 |
| 4,125,019 | 11/1978 | Cushing | 73/861.12 |
| 4,297,897 | 11/1981 | Young | 73/861.12 |
| 4,950,378 | 8/1990 | Nagata | 204/402 |
| 5,136,882 | 8/1992 | Wada | 73/198 |

FOREIGN PATENT DOCUMENTS 0106940 7/1983 European Pat. Off. .
0337292 4/1989 European Pat. Off. .
2082117 3/1990 Japan .

Primary Examiner—Richard E. Chilcot, Jr.
Assistant Examiner—Elizabeth L. Dougherty
Attorney, Agent, or Firm—Lerner, David, Littenberg, Krumholz & Mentlik

[57] ABSTRACT

Apparatus for measuring fluid flow through a conduit including a measuring electrode and a ground electrode disposed in the conduit and connected to form an electrolytic cell, so that a voltage can be applied between the electrodes in order to cleanse deposits from the measuring electrode, and gases generated during the cleansing step can then be dissipated. Methods for measuring the fluid flow in such a manner are also described herein.

21 Claims, 1 Drawing Sheet

MEASURING DEVICE AND METHOD FOR CLEANSING A MEASURING ELECTRODE IN SAID DEVICE

FIELD OF THE INVENTION

The present invention relates to apparatus for measuring fluid flowing through a conduit. More particularly, the present invention relates to apparatus for measuring fluid flowing through a conduit employing at least one measuring electrode and in which the fluid itself can cause depositions on the electrode. The present invention more particularly relates to methods for cleansing measuring electrodes employed in such apparatus.

Still more particularly, the present invention relates to measuring devices employed in connection with measuring relatively small differences between two proportionately large flows of fluids through conduits.

Still more particularly, the present invention relates to such measuring apparatus for use in connection with measurement of ultrafiltration in dialysis, and preferably in hemodialysis. In hemodialysis, the flow of pure dialysis fluid is on the order of magnitude of about 0 to 1000 ml/min flowing to the dialyzer. This flow is increased from the dialyzer by addition of the ultrafiltrate itself, which is usually on the order of magnitude of between about 0 and 40 ml/min or possibly somewhat larger amounts thereof.

BACKGROUND OF THE INVENTION

Two similar systems for electromagnetic flow measurements are described in British Patent Nos. 2,003,274 and 2,056,691. In both of the systems disclosed therein, the flows whose difference is to be measured are flowed through two parallel conduits. In accordance with British Patent No. 2,003,274, such measurement is effected by means of three electrodes, which are influenced by both the flowing medium and an external magnetic field. In accordance with British Patent No. 2,056,691, two main electrodes are influenced in the same manner, and they cooperate with a plurality of earth, or grounded, electrodes.

Both of these systems suffer, however, from the disadvantage that the flowing media can influence the two conduits, and the electrodes themselves in different ways. If, for example, these devices are used for measuring ultrafiltration during dialysis, deposits from the impure water are obtained on the electrodes and/or on the conduit walls themselves. A deposit of the order of few μm, or even less, can then result in considerable reading errors.

An improvement to these two systems is described in European Patent No. 106,940, in which possible reading errors are compensated for by means of repeated calibration of the device.

SUMMARY OF THE INVENTION

In accordance with the present invention these and other objects have been realized by the invention of an improvement in the above-mentioned systems including means for cleaning the electrodes used therein. This invention can, however, also be utilized more generally in connection with measuring electrodes which are in contact with liquid and which need to be cleaned periodically.

In accordance with the present invention, applicants have invented apparatus for measuring a fluid flowing through a conduit, the apparatus including at least one first measuring electrode arranged in the conduit through which the fluid is intended to flow, the fluid being capable of causing deposits to form on the at least one measuring electrode, a second electrode arranged in the conduit and juxtaposed with the at least one first measuring electrode, connection means for connecting the at least one first measuring electrode to the second electrode in an electrolytic cell, the connecting means including voltage means for applying a voltage between the at least one first measuring electrode and the second electrode so as to cleanse the deposits from the at least one measuring electrode and gas dissipating means for subsequently dissipating gases generated at the at least one measuring electrode during the cleansing thereof. Preferably, the at least one measuring electrode comprises a cathode, and in a preferred embodiment, the second electrode is grounded.

In accordance with another embodiment of the apparatus of the present invention, the apparatus includes at least two of the first measuring electrodes connected in parallel with the second electrode, the second electrode being grounded, such that both of the at least two first measuring electrodes can be cleansed of deposits thereby.

In accordance with a preferred embodiment of the apparatus of the present invention, the voltage means is adapted to apply voltage in the range of between about 0.5 and 15 volts for a period of between about 0.1 and 5 seconds.

In accordance with another embodiment of the apparatus of the present invention, the gas dissipating means comprises short circuiting means for intermittently short circuiting the at least one first measuring electrode and the second electrode subsequent to cleansing of the electrode. Preferably, the short circuiting means is adapted to provide such intermittent short circuiting for a period of between about 1 and 60 seconds, and in a preferred embodiment for a period of at least about 5 seconds.

In accordance with another embodiment of the apparatus of the present invention, the gas dissipating means comprises reversal means for reversing the voltage applied between the at least one first measuring electrode and the second electrode after the cleansing of the at least one measuring electrode. Preferably, the reversal means is adapted to reverse the voltage for a period of between about 1 and 60 seconds, and in a preferred embodiment, for a period of at least about 5 seconds.

In accordance with another embodiment of the present invention, apparatus for measuring the differences between fluids flowing through first and second conduits is provided, the apparatus including at least two first measuring electrodes arranged in the first conduit through which the fluid is intended to flow, at least two second measuring electrodes arranged in the second conduit through which the fluid is intended to flow, the fluid being capable of causing deposits to form on the measuring electrodes, ground electrode means connected in parallel to each of the measuring electrodes, and connection means for connecting the at least two first measuring electrodes and the at least two second measuring electrodes to the ground electrode means in an electrolytic cell, the connection means including voltage means for applying a voltage between the measuring electrodes and the ground electrode means so as to cleanse deposits from the measuring electrodes, and gas dissipating means for subsequently dissipating gases generated at the measuring electrode during the cleansing step.

In a preferred embodiment, this apparatus includes means for measuring the differences in fluid flows to a dialyzer adapted for hemodialysis.

In accordance with another embodiment of the present invention, a method is provided for measuring a fluid flowing through a conduit including at least one first measuring electrode arranged in the conduit through which the fluid is intended to flow, the fluid being capable of causing deposits to form on the at least one measuring electrode, the method including providing a second electrode in the conduit in juxtaposition with the at least one first measuring electrode, connecting the at least one first measuring electrode to the second electrode in an electrolytic cell, applying a voltage between the at least one first measuring electrode and the second electrode so as to cleanse deposits from the at least one first measuring electrode, and subsequently dissipating gases generated at the at least one first measuring electrode during the cleansing step.

In a preferred embodiment, the method includes connecting the at least one first measuring electrode as a cathode. Preferably, the method includes grounding the second electrode. In a preferred embodiment, the method includes applying the voltage between the at least one first measuring electrode and the second electrode in the range of between about 0.5 and 15 volts for a period of between about 0.1 and 5 seconds.

In accordance with another embodiment of the method of the present invention, the gas dissipating step includes short circuiting the connection between the at least one first measuring electrode and the second electrode after cleansing of deposits from the at least one first measuring electrode. Preferably, the method includes short circuiting the connection between the at least one first measuring electrode and the second electrode for a period of between about 1 and 60 seconds, and preferably for a period of at least 5 seconds.

In accordance with another embodiment of the method of the present invention, the gas dissipating step includes applying a voltage in an opposite direction between the at least one first measuring electrode and the second electrode after cleansing of deposits from the at least one first measuring electrode.

In a preferred embodiment, the method includes applying such voltage in the opposite direction for a period of between about 1 and 60 seconds, and in a preferred embodiment for a period of at least about 5 seconds.

In accordance with the apparatus discussed above, it is preferred that the measuring electrode be arranged to be connected as a cathode, i.e., with a negative potential. In that case, one or more earth or ground electrodes are used as the positive electrode. Alternately, however, another measuring electrode can be grounded or given a positive potential if desired. At the cathode or the negative pole, the hydrogen in the water flowing therethrough is reduced to hydrogen gas during simultaneous formation of hydroxide ions. A portion of this hydrogen gas is generally dissolved in an atomic state in the underlying electrode metal (via adsorption), while the remaining portion of the hydrogen gas produced therein forms bubbles on the electrode surface. These hydrogen gas bubbles form directly on the outermost atomic layer of the electrode, and therefore effectively drive away dirt from the surface at the same time that the solution is forcibly agitated very close to the metal surface. During the cleansing step, the conduit in which the measuring electrode is arranged must be filled with a solution, such as water, dialysis solution, or some other electrolyte which can conduct a current between the anode and the cathode. The temperature employed must be at least a temperature such that the solution over electrolyte is in a liquid state. Higher temperatures facilitate the cleansing process. The pressure on the liquid in the conduit must not be higher than that at which the hydrogen gas bubbles are formed.

As stated above, the second electrode is preferably a grounded electrode. Alternatively, however, it can also be another measuring electrode as discussed above. In this case, use can potentially be made of a low frequency alternating current so that both the measuring electrodes are cleansed in an alternate pattern. As is further discussed above, practical testing has demonstrated that the voltage means of the present invention should be preferably arranged to apply a voltage in the order of between about 0.5 and 15 volts during a period of at least about 0.1 and 5 seconds. A cathodization time longer than about 5 seconds does not degrade the results obtained, although it also does not improve them significantly. Similarly, a higher voltage does not significantly improve these results. It can also be noted that this voltage differs appreciably from the normal measuring voltage used in these systems, which is usually in the order of magnitude of $10^{-6}$ volts.

It is further noted that the hydrogen gas which has dissolved in the cathode metal, along with the oxygen gas which is precipitated at the anode(s), can form a galvanic element when the cathode voltage has been interrupted. This galvanic element can, in turn, disrupt the function of measuring the flow, and therefore, the apparatus of the present invention is preferably provided along with means to short circuit the connected electrodes after the cleansing step in order to dispel any such hydrogen and oxygen formed during electrolysis in or at the electrodes. Such short circuiting can preferably be arranged for a period of time in the order of between about 1 and 60 seconds, and preferably at least about 5 seconds.

Alternatively, the present invention can include means to apply a voltage to these electrodes after the cleansing step in a direction opposite to the cleansing voltage itself, preferably for time periods in the range of between about 1 and 60 seconds, and most preferably for at least about 5 seconds, in order to dispel any possible hydrogen or oxygen gas formed during electrolysis. In both such cases, the hydrogen which has been formed is oxidized, and the oxygen which has been formed is reduced to pure water.

As is also set forth above, the present invention can also be preferably used in connection with apparatus for measuring the flow in two conduits through which different conduit flows take place, each of which is preferably provided with one or two measuring electrodes for measuring the flow difference between the two conduits, which are themselves arranged to be exposed to an electromagnetic field. In this embodiment, the device preferably includes all of the measuring electrodes being connected in parallel to respective ground electrodes connected to the liquid flows. Preferably, the present device is intended for use to measure the liquid flow differences to and from a dialyzer which is intended for use in hemodialysis.

BRIEF DESCRIPTION OF THE DRAWINGS

In the detailed description which follows, reference is made to the Figures, in which.

DETAILED DESCRIPTION

Figure 1:
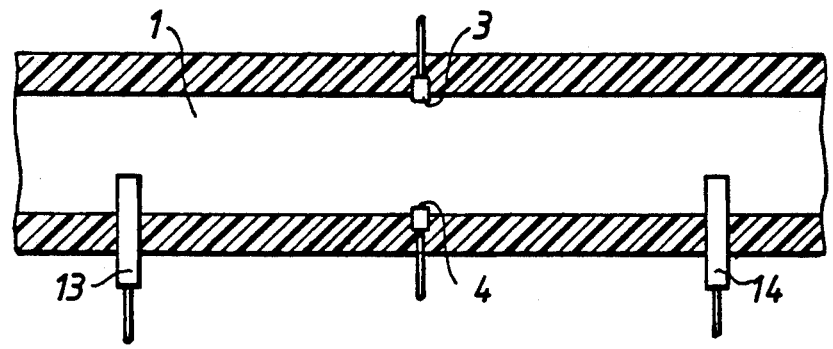
FIG. 1 is a side, elevational, sectional view of a flow conduit including two measuring electrodes and two ground electrodes.
Figure 2:
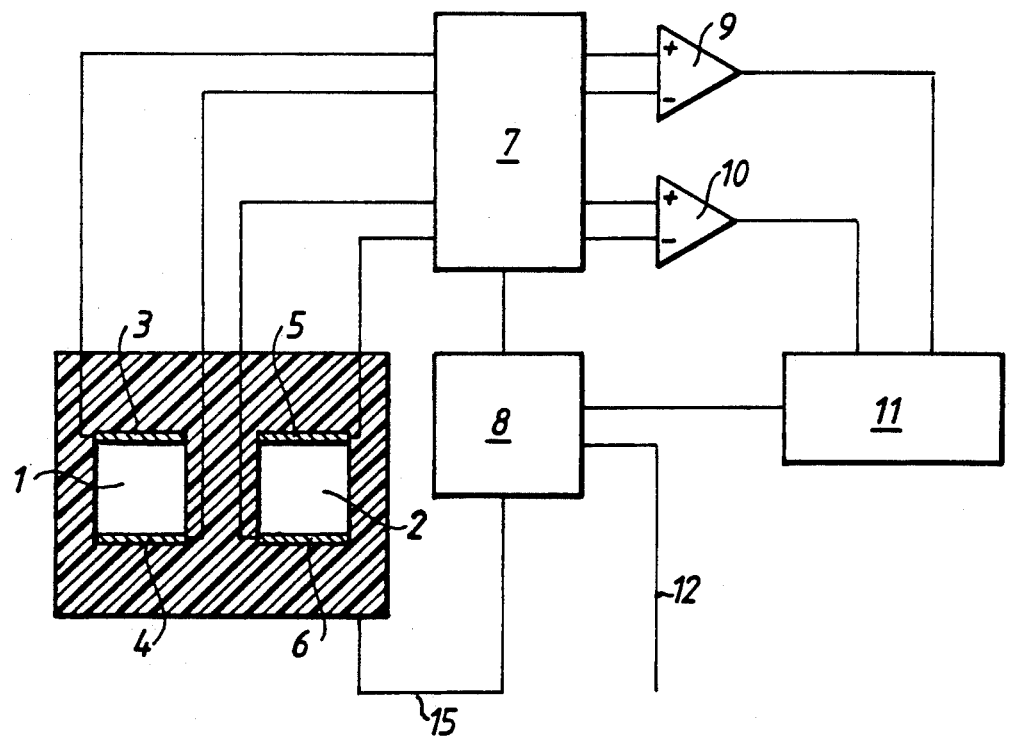
FIG. 2 is a schematic, partially sectional representation of a device for measuring the flow in two flow conduits in accordance with the present invention.

Referring again to the Figures, in which like reference numerals refer to like portions thereof, FIG. 1 includes a flow conduit with two measuring electrodes 3 and 4, and two ground electrodes 13 and 14. A similar conduit 1, with measuring electrodes 3 and 4, is also shown in FIG. 2, but in this case showing a flow measuring device which also includes a second conduit 2 with two measuring electrodes 5 and 6. The measuring process itself can be carried out in the manner described in more detail in the above-mentioned patent publications; namely, British Patent Nos. 2,003,274 and 2,056,691, as well as European Patent No. 106,940, the disclosures of which are incorporated herein by reference thereto. This process therefore does not need to be described in more detail herein.

It can be seen that the four electrodes 3-6 shown in FIG. 2 are connected to a connecting device 7, the purpose of which is to apply the voltages which are required for the cleansing step, as well as to connect the electrodes to a measuring device, which is represented in FIG. 2 by the components 9 and 10. These components are, in turn, connected to a microprocessor 11, or similar such device, which is arranged to control both the measuring and cleansing steps. The voltages which are required for the cleansing step are achieved with the assistance of control device 8, which is connected to the measuring electrodes 3-6 via connecting device 7, and to one or both of the ground electrodes 13 and 14. The latter are not shown in FIG. 2, but connection thereto is represented by reference numeral 15. Reference numeral 12 denotes an external control input to the control device 8. Finally, it can be noted that conduits and 2 are under the influence of an electromagnetic field in a manner such as that described in more detail in the above-mentioned patent publications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for measuring a fluid flowing through a conduit, said apparatus including at least one first measuring electrode arranged in said conduit for said fluid, a second electrode arranged in said conduit and juxtaposed with said at least one first measuring electrode, connection means for connecting said at least one first measuring electrode to said second electrode in a electrolytic cell, said connecting means including voltage means for applying a voltage between said at least one first measuring electrode and said second electrode so as to cleanse deposits formed from said fluid flowing through said conduit on said at least one measuring electrode, and gas dissipating means for subsequently dissipating gases generated at said at least one measuring electrode during said cleansing thereof, said gas dissipating means comprising short circuiting means for intermittently short circuiting said at least one first measuring electrode and said second electrode subsequent to said cleansing.

2. The apparatus of claim 1 wherein said at least one first measuring electrode comprises a cathode.

3. The apparatus of claim 1 wherein said second electrode is grounded.

4. The apparatus of claim 1 including at least two of said first measuring electrodes connected in parallel with said second electrode, said second electrode being grounded, whereby both of said at least two first measuring electrodes can be cleansed of said deposits thereby.

5. The apparatus of claim 1 wherein said voltage means is adapted to apply a voltage in the range of between about 0.5 and 15 volts for a period of between about 0.1 and 5 seconds.

6. The apparatus of claim 1 wherein said short circuiting means is adapted to provide said intermittent short circuit for a period between about 1 and 60 seconds.

7. The apparatus of claim 1 wherein said short circuiting means is adapted to provide said intermittent short circuit for a period of at least about 5 seconds.

8. Apparatus for measuring the differences between the rates of flow of fluids flowing through first and second conduits, said apparatus including at least two first measuring electrodes arranged in said first conduit for said fluid, at least two second measuring electrodes arranged in said second conduit for said fluid, ground electrode means connected in parallel to each of said measuring electrodes, connection means for connecting said at least two first measuring electrodes and said at least two second measuring electrodes to said ground electrode means in an electrolytic cell, said connection means including voltage means for applying a voltage between said measuring electrodes and said ground electrode means so as to cleanse deposits formed from said fluid flowing through said conduit on said measuring electrodes, and gas dissipating means for subsequently dissipating gases generated at said at least two measuring electrodes during said cleansing thereof, said gas dissipating means comprising short circuiting means for intermittently short circuiting said at least two measuring electrodes subsequent to said cleansing.

9. The apparatus of claim 8 for measuring the differences in fluid flows to a dialyzer adapted for hemodialysis.

10. A method for measuring the rate of flow of a fluid flowing through a conduit including at least one first measuring electrode arranged in said conduit for said fluid, said method including providing a second electrode in said conduit in juxtaposition with said at least one first measuring electrode, connecting said at least one first measuring electrode to said second electrode in an electrolytic cell, applying a voltage between said at least one first measuring electrode and said second electrode so as to cleanse deposits formed from said fluid flowing through said conduit on said at least one first measuring electrode, and subsequently dissipating gases generated at said at least one measuring electrode during said cleansing step by short circuiting said connection between said at least one first measuring electrode and said second electrode after such cleansing of said deposits from said at least one first measuring electrode.

11. The method of claim 10 including connecting said at least one first measuring electrode as a cathode.

12. The method of claim 10 including grounding said second electrode.

13. The method of claim 14 including applying said voltage between said at least one first measuring electrode and said second electrode in the range of between about 0.5 and 15 volts for a period of between about 0.1 and 5 seconds.

14. The method of claim 10 including short circuiting said connection between said at least one first measuring electrode and said second electrode for a period of between about 1 and 60 seconds.

15. The method of claim 14 including short circuiting said connection between said at least one measuring electrode and said second electrode for a period of at least about 5 seconds.

16. Apparatus for measuring a fluid flowing through a conduit, said apparatus including at least one first measuring electrode arranged in said conduit for said fluid, a second electrode arranged in said conduit and juxtaposed with said at least one first measuring electrode, connection means for connecting said at least one first measuring electrode to said second electrode in an electrolytic cell, said connecting means including voltage means for applying a voltage between said at least one first measuring electrode and said second electrode so as to cleanse deposits formed from said fluid flowing through said conduit on said at least one measuring electrode, and gas dissipating means for subsequently dissipating gases generated at said at least one measuring electrode during said cleansing thereof, said gas dissipating means comprising reversal means for reversing said voltage applied between said at least one first measuring electrode and said second electrode after said cleansing of said at least one first measuring electrode.

17. The apparatus of claim 16 wherein said reversal means is adapted to reverse said voltage for a period of between about 1 and 60 seconds.

18. The apparatus of claim 16 wherein said reversal means is adapted to reverse said voltage for a period of at least about 5 seconds.

19. A method for measuring the rate of flow of a fluid flowing through a conduit including at least one first measuring electrode arranged in said conduit for said fluid, said method including providing a second electrode in said conduit in juxtaposition with said at least one said first measuring electrode, connecting said at least one measuring electrode to said second electrode in an electrolytic cell, applying a voltage between said at least one first measuring electrode and said second electrode so as to cleanse deposits formed from said fluid flowing through said conduit on said at least one first measuring electrode, and subsequently dissipating gases generated at said at least one measuring electrode during said cleansing step by applying a voltage in an opposite direction between said at least one first measuring electrode and said second electrode after said cleansing of said deposit from said at least one first measuring electrode.

20. The method of claim 19 wherein said applying of said voltage in said opposite direction is carried out for a period of between about 1 and 60 seconds.

21. The method of claim 19 wherein said applying of said voltage in said opposite direction is carried out for a period of at least about 5 seconds.

* * * * *

UNITED STATES PATENT AND TRADEMARK OFFICE
CERTIFICATE OF CORRECTION

PATENT NO. : 5,261,283
DATED : November 16, 1993
INVENTOR(S) : Bertinsson et al.

It is certified that error appears in the above-identified patent and that said Letters Patent is hereby corrected as shown below:

Column 5, line 44, after "conduits" insert --1--.
Column 7, line 7, delete "14" and insert therefor --10--.

Signed and Sealed this

Seventh Day of March, 1995

Attest:

BRUCE LEHMAN

Attesting Officer

Commissioner of Patents and Trademarks